US008510531B1

(12) United States Patent
Haase et al.

(10) Patent No.: US 8,510,531 B1
(45) Date of Patent: Aug. 13, 2013

(54) FAST, DYNAMIC CACHE PACKING (71) Applicants: Chet Haase, Pleasanton, CA (US);
Raphael Linus Levien, Berkeley, CA (US); Romain Guy, Millbrae, CA (US)

(72) Inventors: Chet Haase, Pleasanton, CA (US);
Raphael Linus Levien, Berkeley, CA (US); Romain Guy, Millbrae, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/627,320

(22) Filed: Sep. 26, 2012

Related U.S. Application Data (60) Provisional application No. 61/703,483, filed on Sep. 20, 2012.

(51) Int. Cl.
G06F 12/00 (2006.01)

(52) U.S. Cl.
USPC ........... 711/171; 711/173; 345/544; 345/543; 345/551; 345/557

(58) Field of Classification Search
USPC ........... 345/530–574; 700/95–218; 711/118, 711/170–171, 173
See application file for complete search history.

(56) References Cited

U.S. PATENT DOCUMENTS

| 5,515,081 | A  | * | 5/1996  | Vasilik .......................... 345/545 |
| 7,358,975 | B2 |   | 4/2008  | Wetzel |
| 8,139,075 | B2 |   | 3/2012  | Cohen et al. |
| 2004/0151398 | A1 |   | 8/2004  | Betrisey et al. |
| 2005/0273568 | A1 | * | 12/2005 | Blandy ......................... 711/170 |
| 2006/0120753 | A1 |   | 6/2006  | Moore et al. |
| 2009/0037011 | A1 | * | 2/2009  | Spiridonov et al. ............. 700/98 |

* cited by examiner

Primary Examiner — Matthew Bradley
Assistant Examiner — Nicholas Simonetti
(74) Attorney, Agent, or Firm — McDonnell Boehnen Hulbert & Berghoff LLP (57) ABSTRACT A method for storing information may include determining whether a received data object fits inside a particular one of a plurality of free blocks in a memory bitmap. Each of the plurality of free blocks may include a column of the memory bitmap with a top margin, a bottom margin, and a predetermined width. If the received data object fits, the received data object may be stored in the particular one of the plurality of free blocks, starting at the top margin of the particular one of the plurality of free blocks. The particular one of the plurality of data blocks may be resized by moving the top margin to start below the stored received data object. The determining may include, for each of the plurality of free blocks, a height of the received data object may be compared with a height of each of the free data blocks.

20 Claims, 7 Drawing Sheets

FAST, DYNAMIC CACHE PACKING

CROSS-REFERENCE TO RELATED APPLICATIONS/INCORPORATION BY REFERENCE

This application makes reference to and claims priority to U.S. Provisional Application Ser. No. 61/703,483, filed on Sep. 20, 2012, entitled "Fast, Dynamic Cache Packing," which is incorporated herein by reference in its entirety.

TECHNICAL FIELD

Aspects of the present application relate generally to the field of data storing and memory management. More specifically, certain implementations of the present disclosure relate to fast, dynamic, cache packing.

BACKGROUND

Text, or any other graphic structure, is often drawn into a bitmap or texture, and then copied from there into the drawing destination as needed. This caching mechanism is commonly used in many different applications for a variety of data objects, including icons, images and text characters, known as glyphs.

However, conventional caching techniques for such data objects are inefficient since objects are stored sequentially and without any consideration of individual object size. Such inefficient caching results in using more memory to store more bitmaps to hold all of the necessary drawing objects, as well as using more CPU resources and memory bandwidth to copy larger bitmaps around. For example, bitmaps used on the graphics processing unit (GPU) need to be uploaded to the GPU as textures. Therefore, the larger the textures are, the longer the upload will takes and the more system resources will subsequently be used to copy the bitmaps.

Additional drawback of conventional caching techniques is that fewer drawing objects stored per bitmap results in the cache filling up quickly, which often times necessitates frequent flushing of the cache to make room for other drawing objects that cannot fit. Such frequent cache flushing reduces the utility of the on-chip memory since the system is essentially drawing objects from scratch whenever they are needed, instead of being able to simply copy the cached version of the objects.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for fast, dynamic, cache packing, substantially as shown in and/or described in connection with at least one of the figures, as set forth more completely in the claims.

These and other advantages, aspects and features of the present disclosure, as well as details of illustrated implementation(s) thereof, will be more fully understood from the following description and drawings.

In accordance with an example embodiment of the disclosure, a method for storing information may include determining whether a received data object fits inside a particular one of a plurality of free blocks in a memory bitmap. Each of the plurality of free blocks may include a column of the memory bitmap with a top margin, a bottom margin, and a predetermined width. If the received data object fits, the received data object may be stored in the particular one of the plurality of free blocks, starting at the top margin of the particular one of the plurality of free blocks. The particular one of the plurality of data blocks may be resized by moving the top margin to start below the stored received data object. The determining may include, for each of the plurality of free blocks, a height of the received data object may be compared with a height of each of the plurality of free data blocks. A width of the received data object may be compared with the predetermined width of each of the plurality of free data blocks.

It may be determined that the received data object fits inside the particular one of the plurality of free blocks when the height of the received data object is smaller than the height of the particular one of the plurality of free data blocks, and when the width of the received data object is smaller than the predetermined width of the particular one of the plurality of free data blocks by a difference that does not exceed a predetermined threshold amount. If the received data object does not fit inside the particular one of the plurality of free blocks and the height of the received data object is smaller than the height of the particular one of the plurality of free data blocks, a new free block may be created by partitioning the particular one of the plurality of free blocks, where the new free block is at least as wide as the received data object.

The received data object may be stored in the new free block starting at a top margin of the new free block. A list of the plurality of free blocks may be maintained. At least one of the plurality of free blocks may be discarded from the list, if a size of the at least one of the plurality of free blocks falls below a predetermined threshold size.

In accordance with another example embodiment of the disclosure, a device for storing information may include control circuitry containing programming, which directs the device to perform determining whether a received data object fits inside a particular one of a plurality of free blocks in a memory bitmap. Each of the plurality of free blocks may include a column of the memory bitmap with a top margin, a bottom margin, and a predetermined width. If the received data object fits, the received data object may be stored in the particular one of the plurality of free blocks, starting at the top margin of the particular one of the plurality of free blocks. The particular one of the plurality of data blocks may be resized by the control circuitry by moving the top margin to start below the stored received data object.

For each of the plurality of free blocks, the control circuitry may compare a height of the received data object with a height of each of the plurality of free data blocks. The control circuitry may also compare a width of the received data object with the predetermined width of each of the plurality of free data blocks. The control circuitry may contain programming, which may direct the device to determine that the received data object fits inside the particular one of the plurality of free blocks, if the height of the received data object is smaller than the height of the particular one of the plurality of free data blocks, and if the width of the received data object is smaller than the predetermined width of the particular one of the plurality of free data blocks by a difference that does not exceed a predetermined threshold amount.

If the received data object does not fit inside the particular one of the plurality of free blocks and the height of the received data object is smaller than the height of the particular one of the plurality of free data blocks, the control circuitry may contain programming, which may direct the device to create a new free block by partitioning the particular one of the plurality of free blocks, where the new free block is at least as wide as the received data object. The control circuitry may contain programming, which may direct the device to store the received data object in the new free block starting at a top margin of the new free block.

The control circuitry may contain programming, which may direct the device to maintain a list of the plurality of free blocks. The control circuitry may contain programming, which may direct the device to discard at least one of the plurality of free blocks from the list, if a size of the at least one of the plurality of free blocks falls below a predetermined threshold size.

In accordance with yet another example embodiment of the disclosure, a non-transitory, machine-readable storage medium is disclosed, having stored thereon a computer program having at least one code section for storing information. The at least one code section may be executable by a machine for causing the machine to perform a method including determining whether a received data object fits inside a particular one of a plurality of free blocks in a memory bitmap. Each of the plurality of free blocks may include a column of the memory bitmap with a top margin, a bottom margin, and a predetermined width. The received data object may be stored in the particular one of the plurality of free blocks, starting at the top margin of the particular one of the plurality of free blocks, if the received data object fits. The particular one of the plurality of data blocks may be resized by moving the top margin to start below the stored received data object.

The determining may include code for performing a method including, for each of the plurality of free blocks, comparing a height of the received data object with a height of each of the plurality of free data blocks, and comparing a width of the received data object with the predetermined width of each of the plurality of free data blocks. The at least one code section may include code for determining that the received data object fits inside the particular one of the plurality of free blocks if the height of the received data object is smaller than the height of the particular one of the plurality of free data blocks. It may also be determined that the received data object fits inside the particular one of the plurality of free blocks if, additionally, the width of the received data object is smaller than the predetermined width of the particular one of the plurality of free data blocks by a difference that does not exceed a predetermined threshold amount.

If the received data object does not fit inside the particular one of the plurality of free blocks and the height of the received data object is smaller than the height of the particular one of the plurality of free data blocks, the at least one code section may include code for creating a new free block by partitioning the particular one of the plurality of free blocks, where the new free block is at least as wide as the received data object. The at least one code section may include code for storing the received data object in the new free block starting at a top margin of the new free block. The at least one code section may include code for maintaining a list of the plurality of free blocks, and discarding at least one of the plurality of free blocks from the list, if a size of the at least one of the plurality of free blocks falls below a predetermined threshold size.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "bitmap" may refer to either a bitmap or a texture (textures being essentially bitmaps used, for example, in graphics processing unit (GPU) rendering; bitmaps being used, for example, in GPU drawing).

Typically, glyphs or other small images (e.g., icons) may be stored in such a way that there can be many of them per bitmap. For example, if the characters of the alphabet are drawn in order, they may be stored in a bitmap in the following order:

"abcdefghijklmnopqrstuvwxyz".

However, such memory (cache) utilization may not be very efficient for storing these alphabet characters (or glyphs). For example, the "l" is higher than the "a" and it will take up more vertical space in a row of characters, resulting in the "a" having empty pixels around it. This drawback may become even more pronounced as text of different sizes (e.g., large and small fonts) is drawn, causing a larger disparity between the sizes of the characters in the cache, and potentially more empty and wasted space around the smaller characters. The more unused pixels there are in the cache, the more memory is consumed for caching the necessary objects, and the more system resources are used to handle this increased load.

The present disclosure relates to fast, dynamic, cache packing, which may be used for maximizing cache capacity and storing as many characters (or arbitrary data objects of arbitrary sizes) as possible for any given bitmap, while reducing the amount of wasted space per bitmap.

In accordance with an example embodiment of the disclosure, the concept of "free blocks" may be used in any arbitrary bitmap, or set of bitmaps. A "free block" may designate a column (or a row) of a bitmap with a particular width (or height), which may be available for storing data objects (e.g., glyphs or other characters). A given bitmap (or cache) may have a plurality of available free blocks. For any bitmap, a linked list of the free blocks within the bitmap may be maintained, which list may be scanned to find the best place to store a given drawing object, based on the object's size as well as the size of each free block. The term "remainder space", as used herein, refers to the last free block in a list of free blocks for a given bitmap. The remainder space represents the rest of the space available in a bitmap for allocating to new free blocks. In effect, the remainder space is a free block (the "last" free block), which may be used to carve out other (new)

free blocks out of it (as long as the width of the remainder space is bigger than the width of the new free block that may be required). New free blocks may be created by subdividing the remaining space in a bitmap according to the size requirements of an incoming drawing object. Free blocks may be closed down as they fill up to minimize the time spent scanning the list of free blocks for every new drawing objects that needs to be stored. Each new free block may be a column in the bitmap of the width that it was created with.

Drawing objects may be stored in a particular free block if the object fits within the free block and the object width is deemed "close enough" to the width of the free block. The reason for the "close enough" requirement is to make the columns that result in the cache flexible enough to fit all objects that are close to a column's width, but which do not necessarily fit it exactly. For example, if an object has a width of 40 pixels, it will fit into a free block with a width of 40 pixels. However, the "close enough" concept (or threshold) may be used to fit an object with a width of 39 pixels into the same 40 pixel wide column. In this regard, the cache may be efficiently packed with columns that are well utilized when received data objects may vary by, for example, just a pixel or two, instead of spawning new columns for items which are just slightly larger or smaller (e.g., Latin alphabet glyphs may be of arbitrary height but may differ in width by up to a few pixels).

In accordance with an example embodiment of the disclosure, a method for storing information may include determining whether a received data object fits inside a particular one of a plurality of free blocks in a memory bitmap. Each of the plurality of free blocks may include a column of the memory bitmap with a top margin, a bottom margin, and a predetermined width. If the received data object fits, the received data object may be stored in the particular one of the plurality of free blocks, starting at the top margin of the particular one of the plurality of free blocks. The particular one of the plurality of data blocks may be resized by moving the top margin to start below the stored received data object. The determining may include, for each of the plurality of free blocks, a height of the received data object may be compared with a height of each of the plurality of free data blocks. A width of the received data object may be compared with the predetermined width of each of the plurality of free data blocks.

Figure 1:
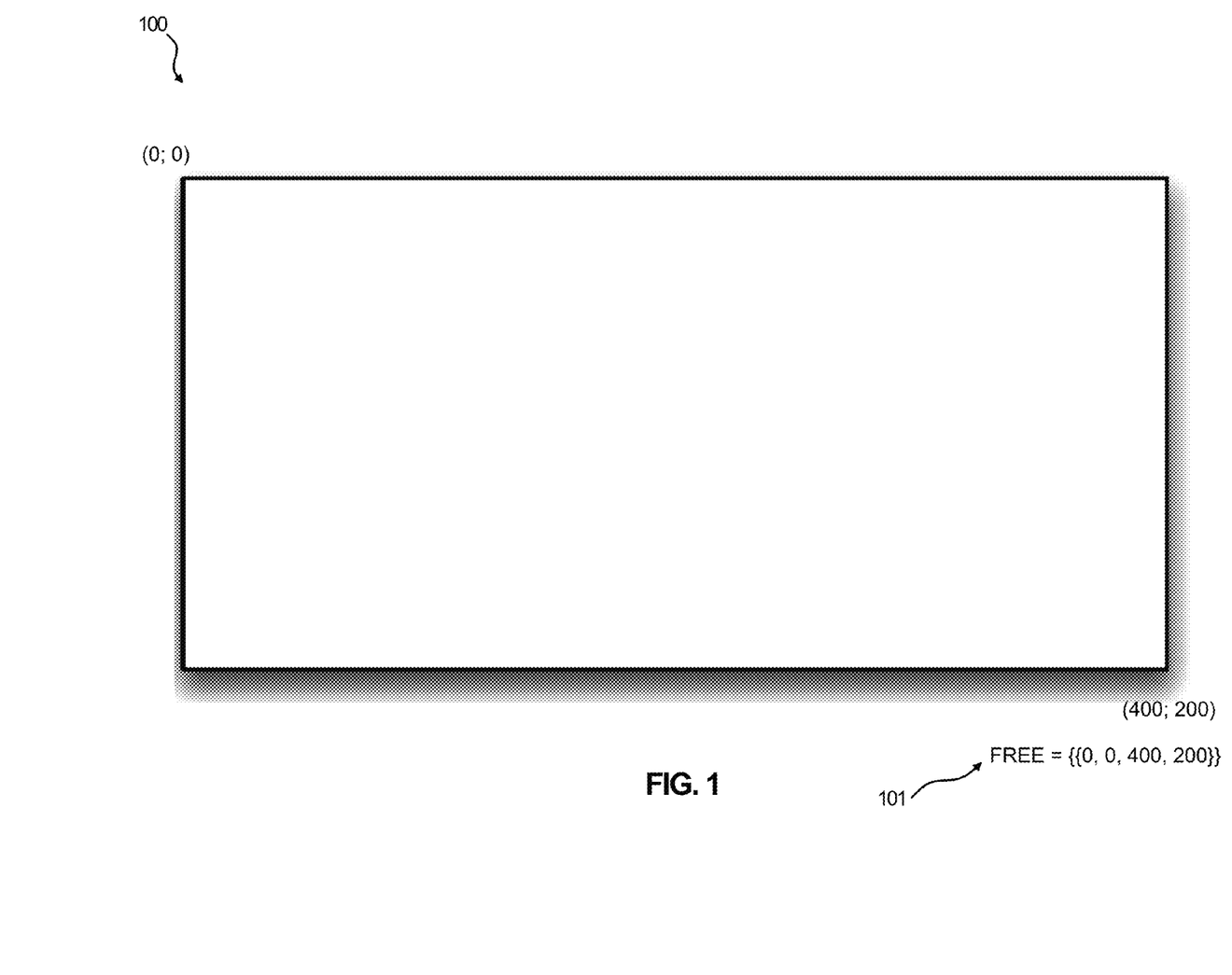
FIG. 1 is a block diagram illustrating an empty bitmap, in accordance with an example embodiment of the disclosure.

FIG. 1 is a block diagram illustrating an empty bitmap, in accordance with an example embodiment of the disclosure. Referring to FIG. 1, there is illustrated an empty bitmap 100. The example bitmap 100 may be of size 400 pixels (width) by 200 pixels (height). The coordinates of the upper left corner of the bitmap may be designated as (0, 0), and the coordinates of the lower right corner may be designated as (400, 200).

The bitmap 100 may be used to store data objects of arbitrary size, such as alphabet characters (or glyphs), which may be received and stored dynamically in the bitmap 100. Additionally, a list 101 of free blocks (e.g., columns of the bitmap with specific width) may be maintained (e.g., stored in another memory location). The free block list 101 may be designated as "FREE". Since the entire bitmap 100 in FIG. 1 is empty, the free block list contains only a single block (namely, the size of entire bitmap). In other words, the free space in the bitmap 100 may be designated as FREE={{0, 0, 400, 200}}, which lists the coordinates of the upper left and lower right corners of the free block. In accordance with an example embodiment of the disclosure, the free blocks in the list 101 may be arranged by size, starting with the smallest and ending with the largest. The remainder space may be placed last in the list 101, after the largest free block. As new free blocks are created, the list may be updated with the new free block and rearranged, if necessary.

Figure 2:
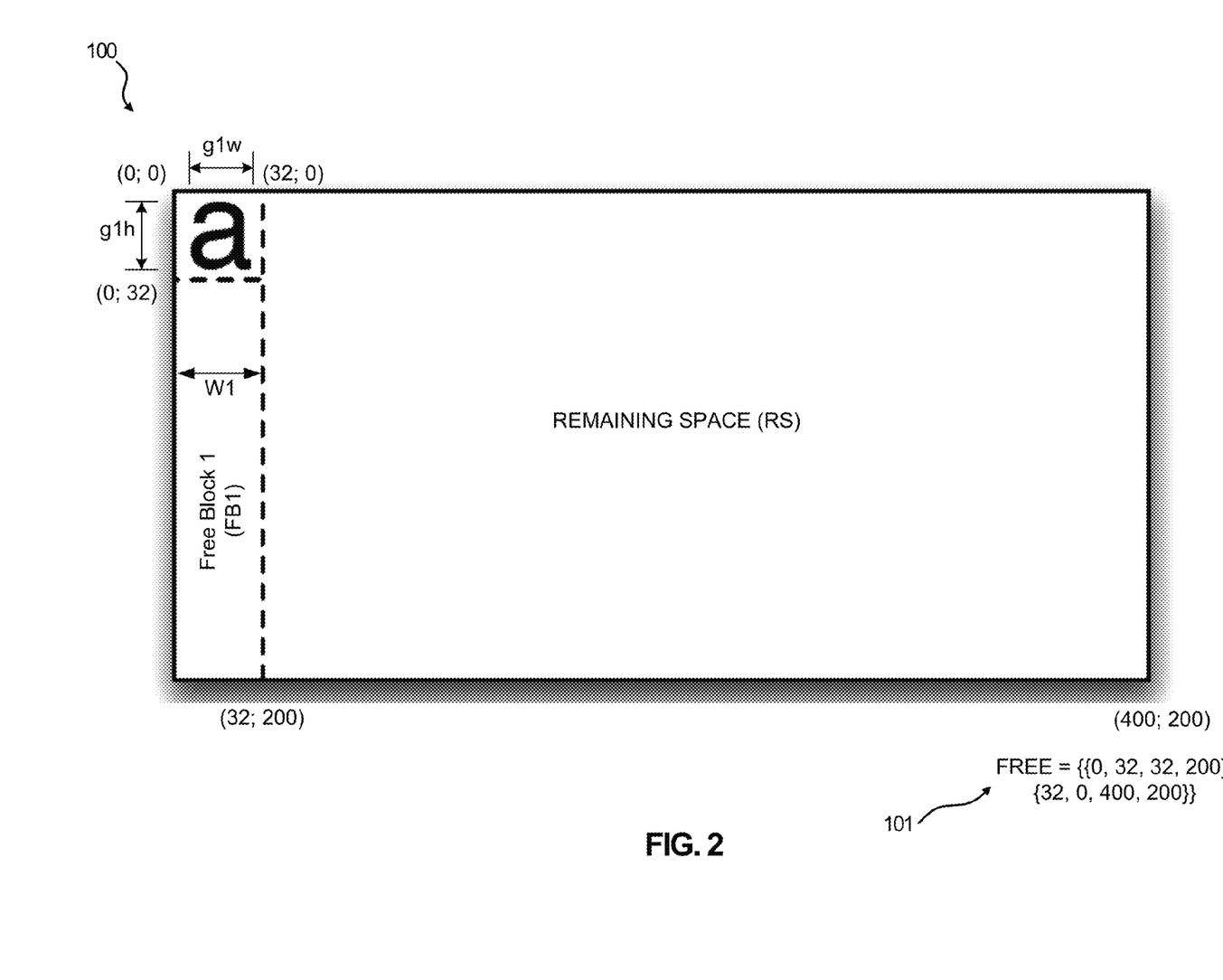
FIGS. 2-4 are block diagrams illustrating packing the bitmap of FIG. 1 with glyphs, in accordance with an example embodiment of the disclosure.
Figure 3:
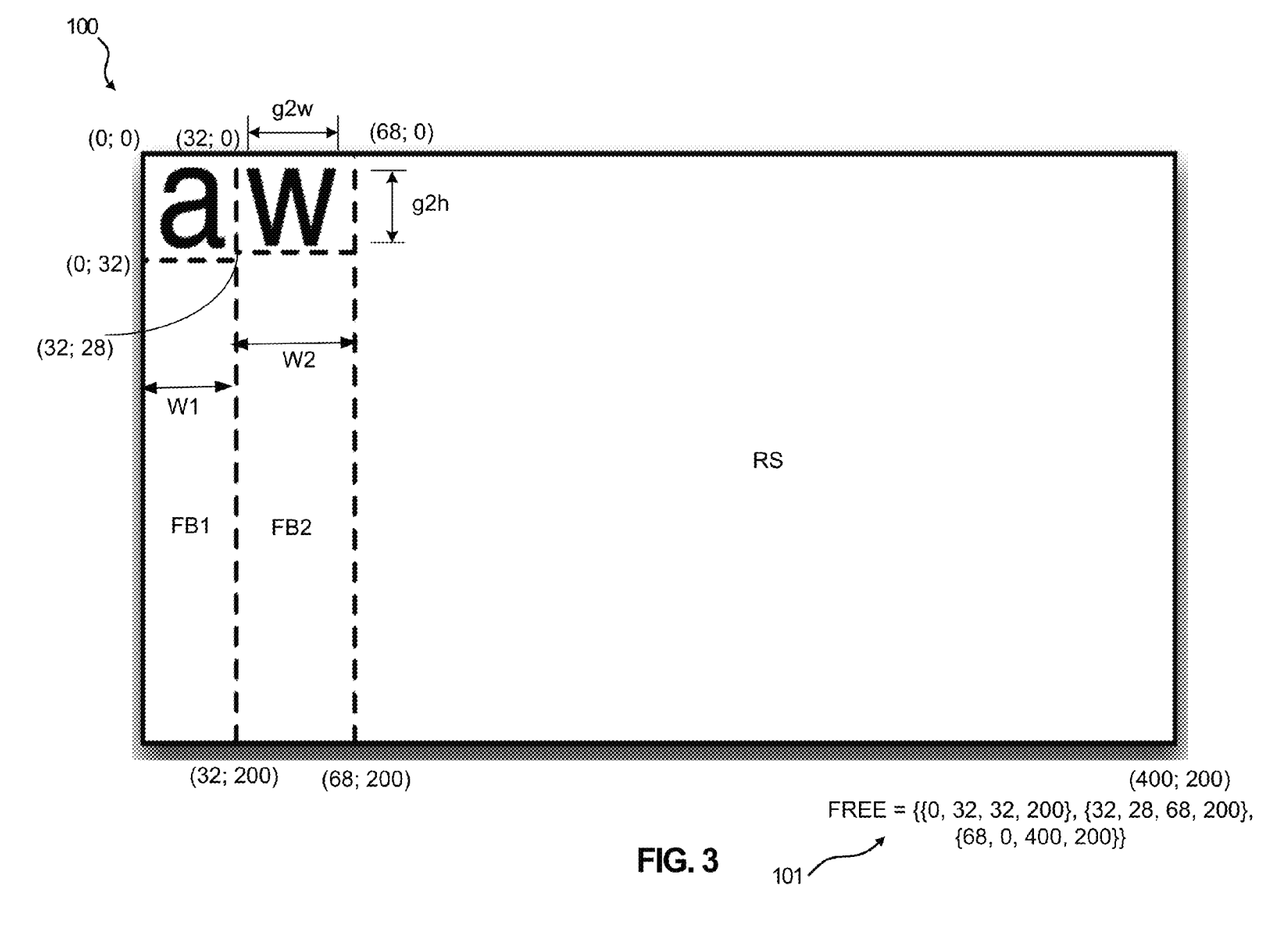
Figure 4:
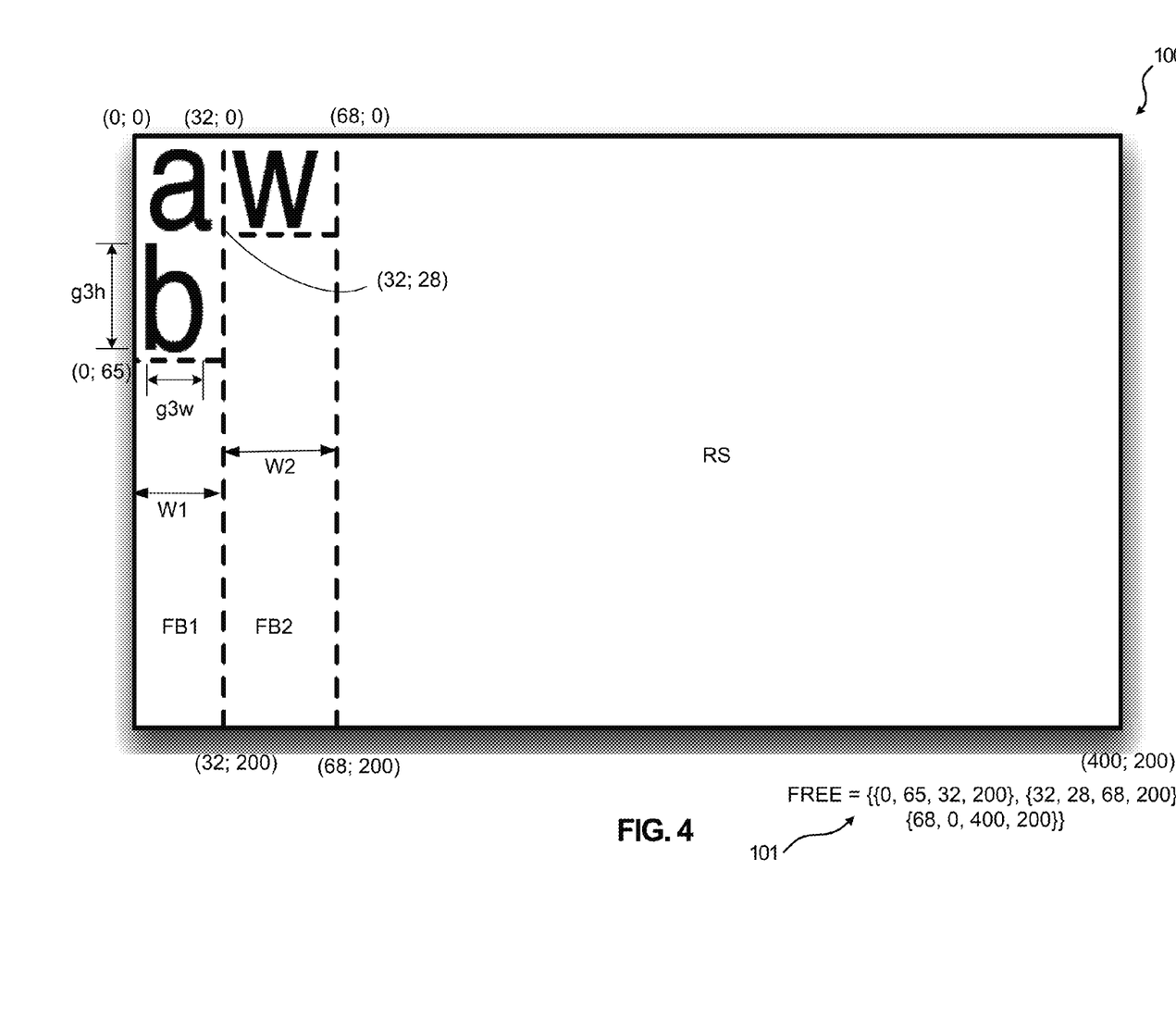

FIGS. 2-4 are block diagrams illustrating packing the bitmap of FIG. 1 with glyphs, in accordance with an example embodiment of the disclosure. Referring to FIG. 2, packing of the bitmap 100 may start by receiving and adding the first glyph "a" to the bitmap. The glyph "a" may have width g1w pixels and height g1h pixels. Initially, it may be determined whether glyph "a" will fit in the free space of bitmap 100 (i.e., the single free space is the size of the entire bitmap 100). More specifically, it may be determined whether g1w is smaller than 400 pixels and g1h is smaller than 200 pixels.

Since the only free block is the entire bitmap 100, a new column (or free block) FB1 may be created and may be sized to the width of the glyph "a" plus a threshold value T, and the height of the bitmap 100. The newly created FB1 may be added in the free block list 101. The remainder space (RS) of the bitmap 100 may be resized to the right of the newly created column for the free block FB1 (space coordinates of RS will be {32, 0, 400, 200}). Glyph "a" may be stored at the top of FB1, occupying example space with coordinates {0, 0, 32, 32}. The free block FB1 may then be resized so its top margin is below glyph "a" (resized FB1 will have coordinates {0, 32, 32, 200}). After FB1 is resized, the free block list 101 may be updated with the current free space coordinates of FB1 and the remainder space (RS), so that FREE={{0, 32, 32, 200}, {32, 0, 400, 200}}.

Referring to FIG. 3, the glyph "w" (with a width of g2w and height of g2h) may be added to bitmap 100. Since glyph "w" is wider than the "a" glyph and FB1, adding it results in the creation of a new free block FB2, and resizing of the remainder space RS.

More specifically, the width g2w of glyph "w" may be wider than g1w and W1. A new free block FB2 may be created with width W2, and coordinates of FB2 may be inserted in the free block list 101. The remainder space RS may be resized to the right of FB2 (space coordinates of RS will be {68, 0, 400, 200}). Glyph "w" may be stored at the top of FB2, occupying example space with coordinates {32, 0, 68, 28}. The free block FB2 may then be resized so its top margin is below glyph "w" (resized FB2 will have coordinates {32, 28, 68, 200}). After FB2 is resized, the free block list 101 may be updated with the current free space coordinates of FB2 and the remainder space (RS), so that FREE={{0, 32, 32, 200}, {32, 28, 68, 200}, {68, 0, 400, 200}}.

Referring to FIG. 4, the glyph "b" (with a width of g3w and height of g3h) may be added to bitmap 100. Since glyph "b" is close enough to the width W1 of FB1, glyph "b" is added to FB1, and then FB1 is resized accordingly.

More specifically, the width g3w of glyph "b" may be less than W1. Glyph "b" may then be stored below glyph "a" in FB1, and FB1 may be resized so its top margin is below glyph "b" (resized FB1 will have coordinates {0, 65, 32, 200}). After FB1 is resized, the free block list 101 may be updated with the current free space coordinates of FB1, so that FREE={{0, 65, 32, 200}, {32, 28, 68, 200}, {68, 0, 400, 200}}.

As seen in FIGS. 2-4, the width W1 of free block FB1 is sized slightly larger than the width g1w of glyph "a" (and the width W2 of FB2 is sized slightly larger than the width g2w of glyph "w"). More specifically, W1 may be sized to be a multiple of T-pixels and slightly larger (e.g., by a maximum variation threshold of T pixels). In the specific example of FIGS. 2-4, T=4 pixels. FB1 may be sized with a width of W1=32 pixels (a multiple of 4) so that glyphs (or other data objects) with a width of 29, 30, 31, or 32 pixels may be stored in FB1 (i.e., glyphs with a maximum 4-pixel width variation below, and including, width W1). Similarly, FB2 may be sized with a width of W2=36 pixels (also a multiple of 4) so that glyphs (or other data objects) with a width of 33, 34, 35, or 36 pixels may be stored in FB2 (i.e., glyphs with a maximum 4-pixel width variation below, and including, width W2). In this regard, the bitmap 100 may be efficiently packed with columns that are well utilized when received data objects may vary by, for example, just a pixel or two, instead of spawning new columns for items which are just slightly larger or smaller Even though a specific implementation (where T=4, the column width is a multiple of 4 pixels and the maximum variation threshold is 4 pixels) is illustrated in FIGS. 2-4, the present disclosure may not be limited in this regard and other implementations may use a different value for T. In instances when the data objects are of uniform width, variation threshold for the column width may not be used and free blocks may be selected with widths that exactly match the width of the data objects.

Additionally, even though FIGS. 2-4 illustrate cache packing where the free blocks are bitmap columns, the present disclosure may not be limited in this regard. More specifically, bitmap rows may be used in place of the columns. In this instance, new rows may be created based on variation in height (instead of width) of the received objects, and the remainder space will move to the bottom of the bitmap (instead of to the right side of the bitmap as illustrated in FIGS. 2-4).

Figure 5:
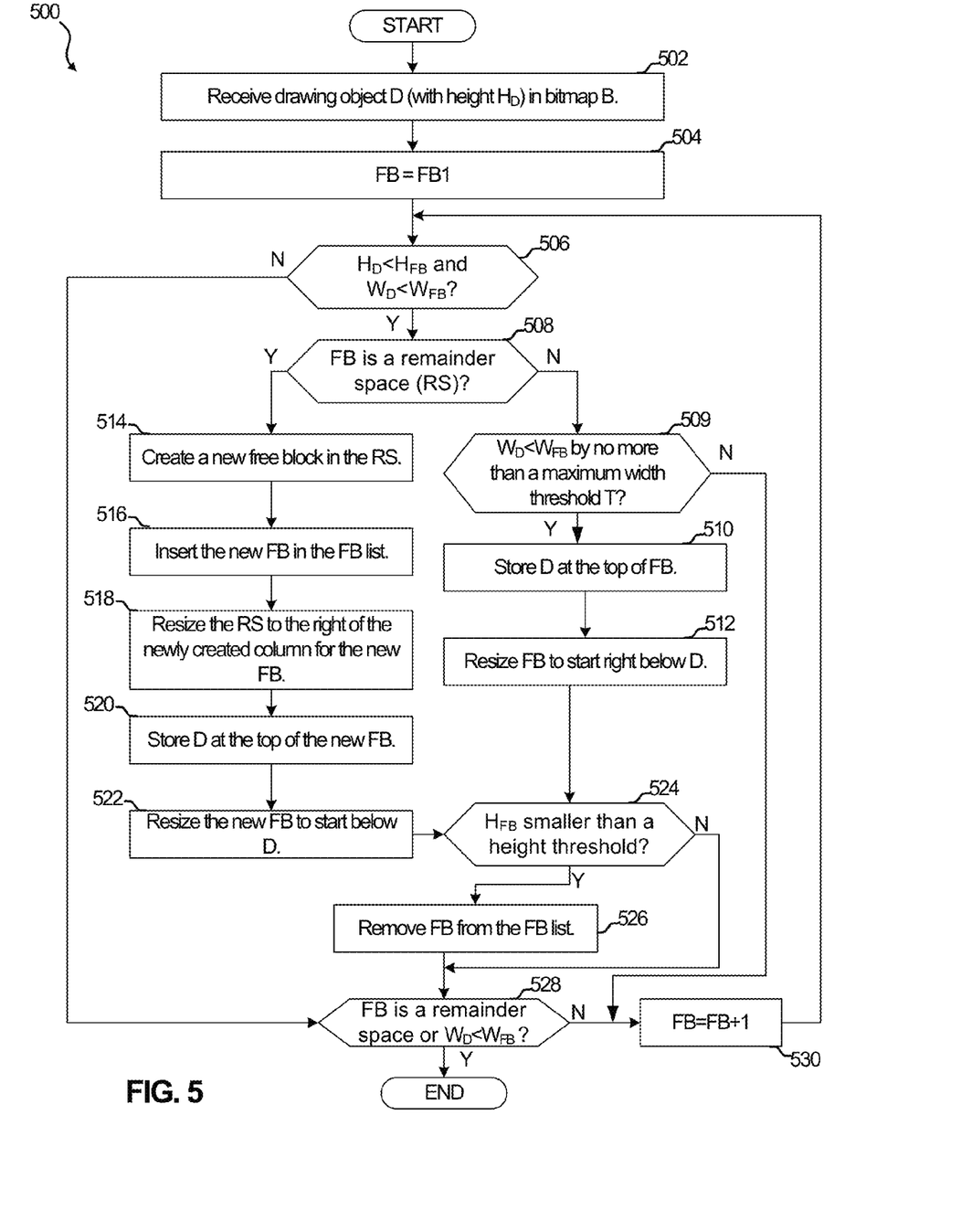
FIG. 5 is a flow chart illustrating example steps of a method for storing information, in accordance with an example embodiment of the disclosure.

FIG. 5 is a flow chart illustrating example steps of a method for storing information, in accordance with an example embodiment of the disclosure. Referring to FIGS. 2-5, the example method 500 may start at 502, a drawing object D (with height $H_D$) may be received in bitmap B. At 504, a processing cycle may start so that steps 506-528 may be repeated for all free blocks (including the remainder space) in the bitmap. At 504, initially FB may be the first free block FB1 in the free block list.

At 506, it may be determined whether the height and width of the drawing object D are smaller than the heights and width of the free block FB. If they are not, processing may continue at 528, when it may be determined if the free block is the remainder space (i.e., the last free block in the cache). If it is, processing concludes. If it is not, processing resumes at 530, when the next free block is taken (FB is incremented by one, FB=FB+1).

If the height and width of the drawing object D are smaller than the heights and width of the free block FB, at 508 it may be determined whether FB is a remainder space. If FB is a remainder space, at 514, a new free block may be created in the remainder space. At 516, the newly created FB may be inserted in the FB list (e.g., 101). At 518, the remainder space RS may be resized to the right of the newly created column for the new FB. At 520, the drawing object D may be stored at the top of the new FB. At 522, the new FB may be resized to start below D.

If FB is not a remainder space, at 509 it may be determined whether the width of D is smaller than the width of the FB by no more than a maximum threshold. If it is not, processing may resume at block 530 (increment FB and process the next FB in the FB list). If it is, at 510, D may be stored at the top of FB. At 512, FB may be resized to start below D.

At 524, it may be determined whether the height of FB is smaller than a height threshold. If it is not, processing may resume at block 528. If it is, at 526, the FB may be removed from the FB list.

In reference to FIGS. 2 and 5, when the first glyph "a" is received, FB will be the entire bitmap (i.e., FB is the remainder space). In this instance, step 506 will return YES and step 508 will return YES. Processing may then continue through 514-522, creating FB1 with coordinates {0, 32, 32, 200}, and resizing RS to {32, 0, 400, 200}. Block 524 will return NO, block 528 will return YES, and processing concludes.

In reference to FIGS. 3 and 5, when the second glyph "w" is received, the FB list 101 includes FB1 and RS (the remainder space). The processing cycle first starts with FB=FB1. In this instance, 506 will return NO, 528 will return NO and, at 530, FB may be incremented by one (i.e., FB is the remainder space).

Block 506 will now return YES and 508 will return YES. Processing may then continue through 514-522, creating FB2 with coordinates {32, 28, 68, 200}, and resizing RS to {68, 0, 400, 200}. Block 524 will return NO, block 528 will return YES, and processing concludes.

In reference to FIGS. 4 and 5, when the third glyph "b" is received, the FB list 101 includes FB1, FB2 and RS (the remainder space). The processing cycle first starts with FB=FB1. In this instance, 506 will return YES, and 508 will return NO. Step 509 will return YES since the width of glyph "b" is slightly smaller than the width W1 of FB1. Processing may then continue through 510-512, storing "b" in FB1 and resizing FB1 with new coordinates {0, 65, 32, 200}. Block 524 will return NO, block 528 will return YES, and processing concludes.

Figure 6:
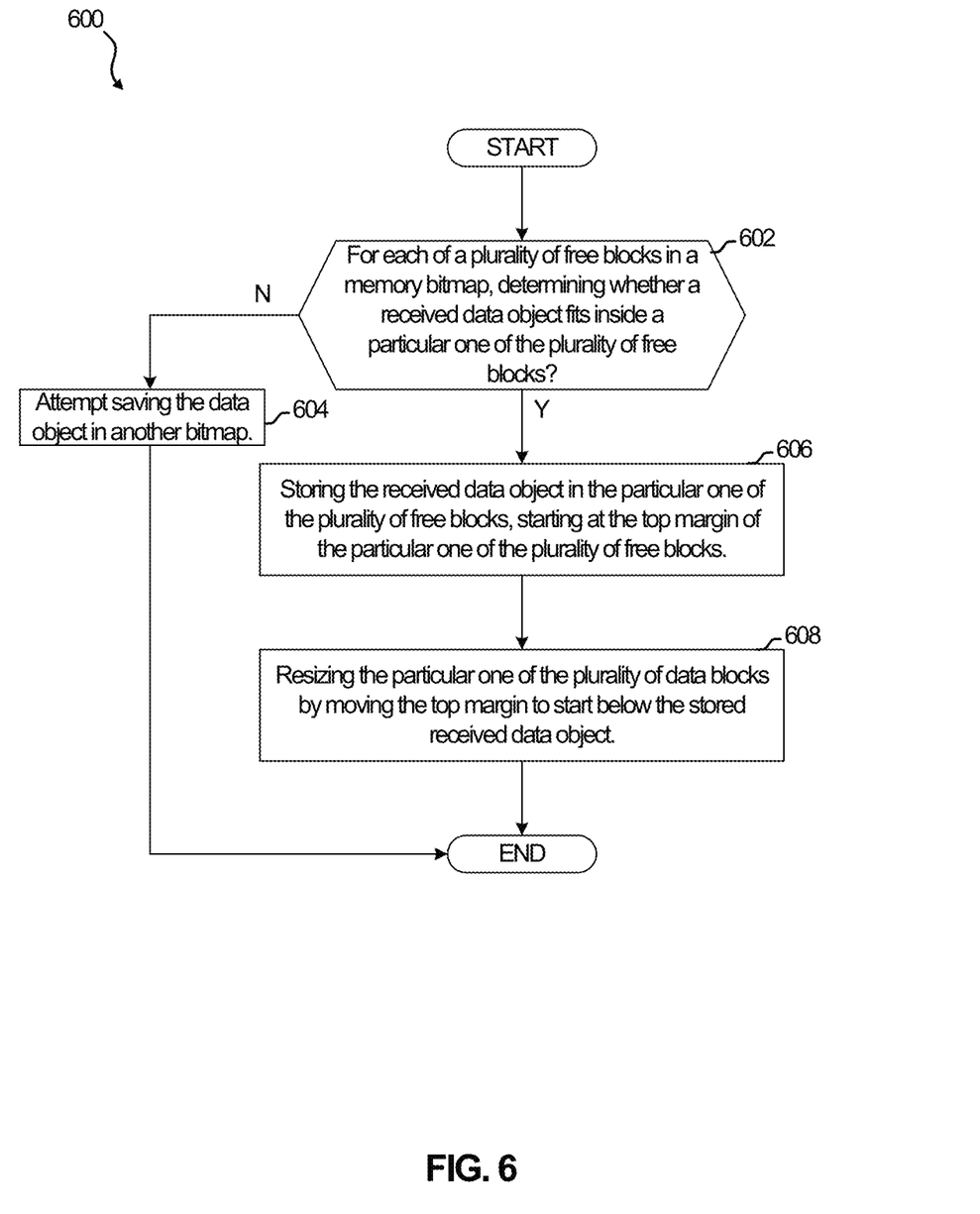
FIG. 6 is a flow chart illustrating example steps of a method for storing information, in accordance with an example embodiment of the disclosure.

FIG. 6 is a flow chart illustrating example steps of a method for storing information, in accordance with an example embodiment of the disclosure. Referring to FIGS. 2-4 and 6, the example method 600 may start at 602, when, for each of a plurality of free blocks (e.g., FB1, FB2, and RS) in a memory bitmap (e.g., 101), it may be determined whether a received data object fits inside a particular one of the plurality of free blocks (e.g., as explained above when glyphs "a", "w", and "b" are received).

If it fits, at 606, the received data object may be stored in the particular one of the plurality of free blocks (FB1, FB2 or RS), starting at the top margin of the particular one of the plurality of free blocks. At 608, the particular one of the plurality of data blocks may be resized by moving the top margin to start below the stored received data object (as explained above with regard to resizing FB1 and FB2).

If the received data object does not fit, at 604, the data object may be saved in another bitmap (or alternatively, data may be deleted from the current bitmap and the newly freed space may be used for storing).

Figure 7:
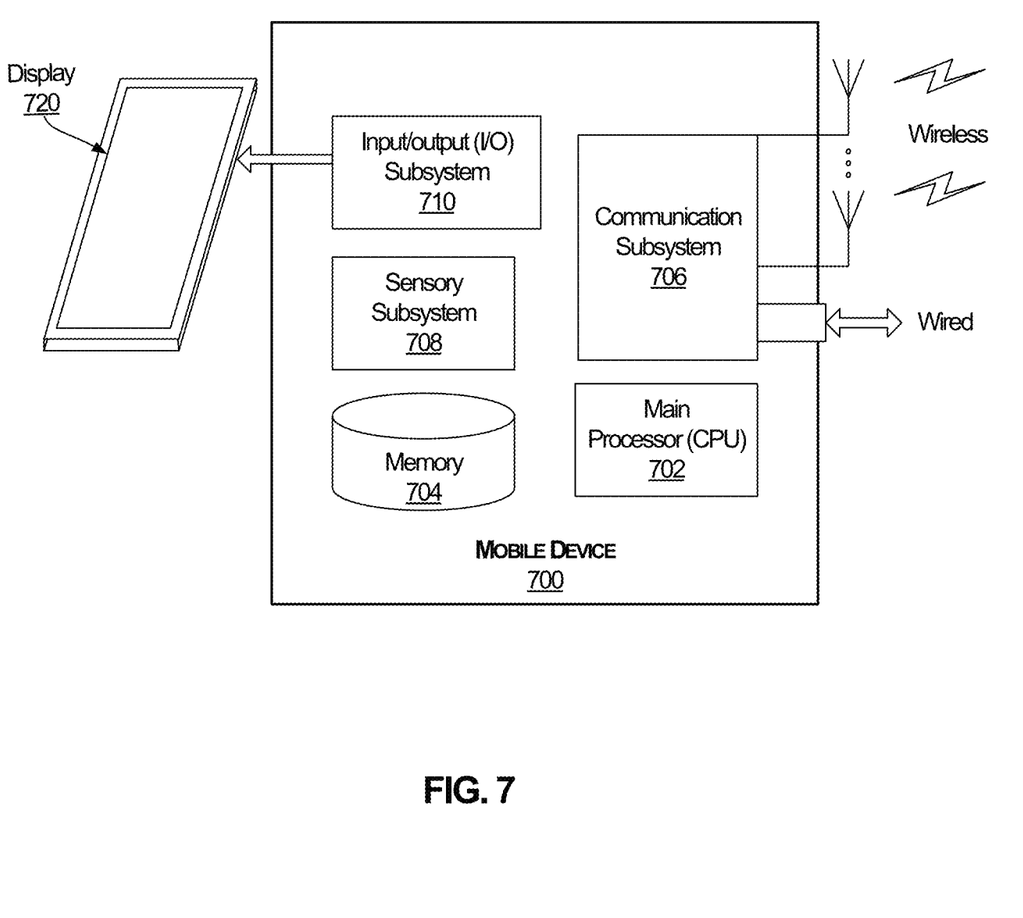
FIG. 7 is a block diagram of an example device, which may be used for storing information, in accordance with an example embodiment of the disclosure.

FIG. 7 is a block diagram of an example device, which may be used for storing information, in accordance with an example embodiment of the disclosure. Referring to FIG. 7, the mobile device 700 may comprise suitable logic, circuitry, interfaces, and/or code that may be operable to implement various aspects of the bitmap packing, as described above and in reference to FIGS. 1-6. The mobile device 700 may comprise, for example, a main processor (CPU) 702, a system memory 704, a communication subsystem 706, a sensory and input/output (I/O) subsystem 708, an input/output (I/O) subsystem 710, and a display 720.

The main processor 702 may comprise suitable logic, circuitry, interfaces, and/or code that may be operable to process data, and/or control and/or manage operations of the mobile device 700, and/or tasks and/or applications performed therein in connection with managing data storage in one or more bitmaps (or caches) in memory 704. In this regard, the main processor 302 may be operable to configure and/or control operations of various components and/or subsystems of the mobile device 700, by utilizing, for example, one or more control signals. The main processor 702 enables running and/or execution of applications, programs and/or code, which may be stored, for example, in the system memory 704. Alternatively, one or more dedicated application processors may be utilized for running and/or executing applications (or programs) in the mobile device 700.

In some instances, one or more of the applications running and/or executing on the mobile device 700 may generate and/or update video content that may be rendered via the display 720. In other instances, one or more of the applications running and/or executing on the mobile device 700 may be used to perform functionalities explained herein in reference to storing data objects and organizing (or packing) memory 704.

The system memory 704 may comprise suitable logic, circuitry, interfaces, and/or code that may enable permanent and/or non-permanent storage, buffering, and/or fetching of data, code and/or other information, which may be used, consumed, and/or processed. In this regard, the system memory 704 may comprise different memory technologies, including, for example, read-only memory (ROM), random access memory (RAM), Flash memory, solid-state drive (SSD), and/or field-programmable gate array (FPGA). The system memory 704 may store, for example, configuration data, which may comprise parameters and/or code, comprising software and/or firmware.

The communication subsystem 706 may comprise suitable logic, circuitry, interfaces, and/or code operable to communicate data from and/or to the mobile device, such as via one or more wired and/or wireless connections. The communication subsystem 706 may be configured to support one or more wired protocols (e.g., Ethernet standards, MOCA, etc.) and/or wireless protocols or interfaces (e.g., Bluetooth, WiFi, cellular, WiMAX, and/or any other available wireless protocol/interface), facilitating transmission and/or reception of signals to and/or from the mobile device 700, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 706 may provide wired and/or wireless connections to external devices and networks.

The sensory subsystem 708 may comprise suitable logic, circuitry, interfaces, and/or code for obtaining and/or generating sensory information, which may relate to the mobile device 700, its user(s), and/or its environment. For example, the sensory and I/O subsystem 708 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 710 may comprise suitable logic, circuitry, interfaces, and/or code for enabling user interactions with the mobile device 700, enabling obtaining input from user(s) and/or to providing output to the user(s). The I/O subsystem 710 may support various types of inputs and/or outputs, including, for example, video, audio, and/or textual. In this regard, dedicated I/O devices and/or components, external to or integrated within the mobile device 700, may be utilized for inputting and/or outputting data during operations of the I/O subsystem 710. Exemplary I/O devices may comprise displays, mice, keyboards, touchscreens, voice input interfaces, and other input/output interfaces or devices. With respect to video outputs, the I/O subsystem 710 may be operable to generate and/or process video content, graphics, and/or textual data, and/or generate video frames based thereon for display, via the display 720 for example.

The display 720 may comprise suitable logic, circuitry, interfaces and/or code that may enable displaying of video content, which may be handled and/or processed via the I/O subsystem 710. The display 720 may be used in outputting video data, which may comprise contacts lists.

In accordance with an example embodiment of the disclosure, a device (e.g., the mobile device 700) for storing information may include control circuitry (e.g., CPU 702) containing programming, which directs the device 700 to perform determining whether a received data object fits inside a particular one of a plurality of free blocks in a memory bitmap in the memory 704. Each of the plurality of free blocks may include a column of the memory bitmap with a top margin, a bottom margin, and a predetermined width. If the received data object fits, the received data object may be stored in the particular one of the plurality of free blocks, starting at the top margin of the particular one of the plurality of free blocks. The particular one of the plurality of data blocks may be resized by the control circuitry 702 by moving the top margin to start below the stored received data object.

For each of the plurality of free blocks, the control circuitry 702 may compare a height of the received data object with a height of each of the plurality of free data blocks. The control circuitry 702 may also compare a width of the received data object with the predetermined width of each of the plurality of free data blocks. The control circuitry 702 may contain programming, which may direct the device 700 to determine that the received data object fits inside the particular one of the plurality of free blocks, if the height of the received data object is smaller than the height of the particular one of the plurality of free data blocks, and if the width of the received data object is smaller than the predetermined width of the particular one of the plurality of free data blocks by a difference that does not exceed a predetermined threshold amount.

The control circuitry 702 may contain programming, which may direct the device to create a new free block by partitioning the particular one of the plurality of free blocks, if the received data object does not fit inside the particular one of the plurality of free blocks and the height of the received data object is smaller than the height of the particular one of the plurality of free data blocks. A width of the new free block may exceed the width of the particular one of the plurality of free data blocks by the predetermined threshold amount. The control circuitry 702 may contain programming, which may direct the device 700 to store the received data object in the new free block starting at a top margin of the new free block.

The control circuitry 702 may contain programming, which may direct the device 700 to maintain a list of the plurality of free blocks in memory 704. The control circuitry 702 may contain programming, which may direct the device 700 to discard at least one of the plurality of free blocks from the list, if a size of the at least one of the plurality of free blocks falls below a predetermined threshold size.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for storing information.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method for storing information, the method comprising:
   determining whether a received data object fits inside a particular one of a plurality of free blocks in a memory bitmap, wherein:
      each of the plurality of free blocks comprises a column of the memory bitmap with a top margin, a bottom margin, and a predetermined width;
   if the received data object fits, storing the received data object in the particular one of the plurality of free blocks, starting at the top margin of the particular one of the plurality of free blocks; and
   resizing the particular one of the plurality of data blocks by moving the top margin to start below the stored received data object.

2. The method according to claim 1, wherein the determining comprises:
   for each of the plurality of free blocks:
      comparing a height of the received data object with a height of each of the plurality of free data blocks; and
      comparing a width of the received data object with the predetermined width of each of the plurality of free data blocks.

3. The method according to claim 2, comprising:
   determining that the received data object fits inside the particular one of the plurality of free blocks if:
      the height of the received data object is smaller than the height of the particular one of the plurality of free data blocks; and
      the width of the received data object is smaller than the predetermined width of the particular one of the plurality of free data blocks by a difference that does not exceed a predetermined threshold amount.

4. The method according to claim 3, comprising:
   if the received data object does not fit inside the particular one of the plurality of free blocks and the height of the received data object is smaller than the height of the particular one of the plurality of free data blocks:
      creating a new free block by partitioning the particular one of the plurality of free blocks, wherein the new free block is at least as wide as the received data object.

5. The method according to claim 4, comprising:
   storing the received data object in the new free block starting at a top margin of the new free block.

6. The method according to claim 1, comprising:
   maintaining a list of the plurality of free blocks.

7. The method according to claim 6, comprising:
   discarding at least one of the plurality of free blocks from the list, if a size of the at least one of the plurality of free blocks falls below a predetermined threshold size.

8. A device for storing information, comprising:
   control circuitry containing programming, which directs the device to perform:
      determining whether a received data object fits inside a particular one of a plurality of free blocks in a memory bitmap, wherein:
         each of the plurality of free blocks comprises a column of the memory bitmap with a top margin, a bottom margin, and a predetermined width;
      if the received data object fits, storing the received data object in the particular one of the plurality of free blocks, starting at the top margin of the particular one of the plurality of free blocks; and
      resizing the particular one of the plurality of data blocks by moving the top margin to start below the stored received data object.

9. The device according to claim 8, wherein the determining comprises:
   for each of the plurality of free blocks:
      the control circuitry comparing a height of the received data object with a height of each of the plurality of free data blocks; and
      the control circuitry comparing a width of the received data object with the predetermined width of each of the plurality of free data blocks.

10. The device according to claim 9, wherein the control circuitry contains programming, which directs the device to perform:
    determining that the received data object fits inside the particular one of the plurality of free blocks if:
       the height of the received data object is smaller than the height of the particular one of the plurality of free data blocks; and
       the width of the received data object is smaller than the predetermined width of the particular one of the plurality of free data blocks by a difference that does not exceed a predetermined threshold amount.

11. The device according to claim 10, wherein the control circuitry contains programming, which directs the device to perform:
    if the received data object does not fit inside the particular one of the plurality of free blocks and the height of the received data object is smaller than the height of the particular one of the plurality of free data blocks:
       creating a new free block by partitioning the particular one of the plurality of free blocks, wherein the new free block is at least as wide as the received data object.

12. The device according to claim 11, wherein the control circuitry contains programming, which directs the device to perform:

storing the received data object in the new free block starting at a top margin of the new free block.

13. The device according to claim 8, wherein the control circuitry contains programming, which directs the device to perform:

maintaining a list of the plurality of free blocks.

14. The device according to claim 13, wherein the control circuitry contains programming, which directs the device to perform:

discarding at least one of the plurality of free blocks from the list, if a size of the at least one of the plurality of free blocks falls below a predetermined threshold size.

15. A non-transitory, machine-readable storage medium, having stored thereon a computer program having at least one code section for storing information, the at least one code section executable by a machine for causing the machine to perform a method comprising:

determining whether a received data object fits inside a particular one of a plurality of free blocks in a memory bitmap, wherein:

each of the plurality of free blocks comprises a column of the memory bitmap with a top margin, a bottom margin, and a predetermined width;

if the received data object fits, storing the received data object in the particular one of the plurality of free blocks, starting at the top margin of the particular one of the plurality of free blocks; and     resizing the particular one of the plurality of data blocks by moving the top margin to start below the stored received data object.

16. The machine-readable storage medium according to claim 15, wherein the determining includes code for performing a method comprising:

for each of the plurality of free blocks:

comparing a height of the received data object with a height of each of the plurality of free data blocks; and         comparing a width of the received data object with the predetermined width of each of the plurality of free data blocks.

17. The machine-readable storage medium according to claim 16, wherein the at least one code section includes code for performing a method comprising:

determining that the received data object fits inside the particular one of the plurality of free blocks if:

the height of the received data object is smaller than the height of the particular one of the plurality of free data blocks; and         the width of the received data object is smaller than the predetermined width of the particular one of the plurality of free data blocks by a difference that does not exceed a predetermined threshold amount.

18. The machine-readable storage medium according to claim 17, wherein the at least one code section includes code for performing a method comprising:

if the received data object does not fit inside the particular one of the plurality of free blocks and the height of the received data object is smaller than the height of the particular one of the plurality of free data blocks:

creating a new free block by partitioning the particular one of the plurality of free blocks, wherein the new free block is at least as wide as the received data object.

19. The machine-readable storage medium according to claim 18, wherein the at least one code section includes code for performing a method comprising:

storing the received data object in the new free block starting at a top margin of the new free block.

20. The machine-readable storage medium according to claim 15, wherein the at least one code section includes code for performing a method comprising:

maintaining a list of the plurality of free blocks; and discarding at least one of the plurality of free blocks from the list, if a size of the at least one of the plurality of free blocks falls below a predetermined threshold size.

\* \* \* \* \*